Sept. 4, 1962 J. A. MAURER 3,052,172
RADIANT ENERGY SHUTTER APPARATUS
Filed Feb. 13, 1959 4 Sheets-Sheet 3
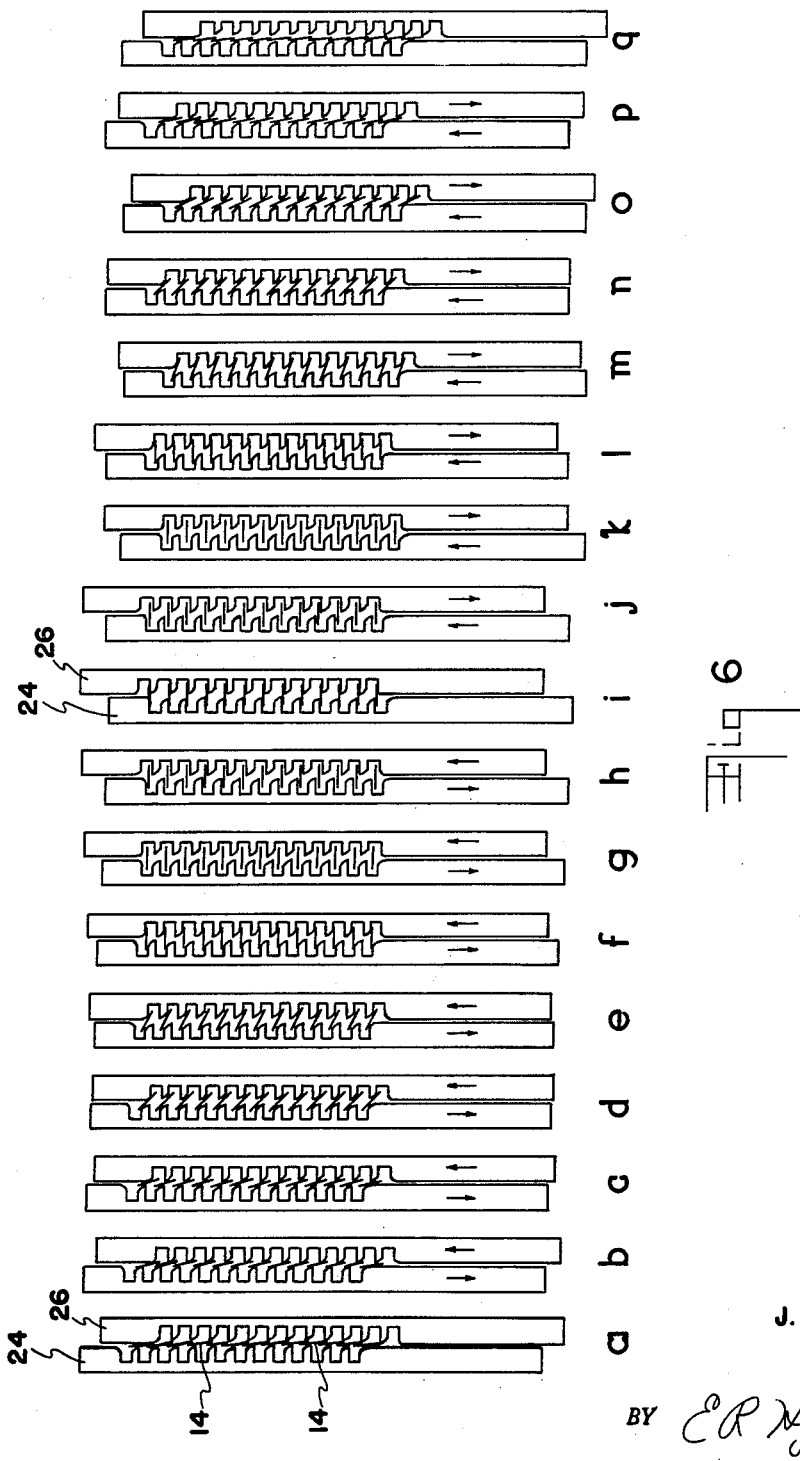
J. A. MAURER
INVENTOR.
BY E. R. Hyde Jr.
ATTORNEY

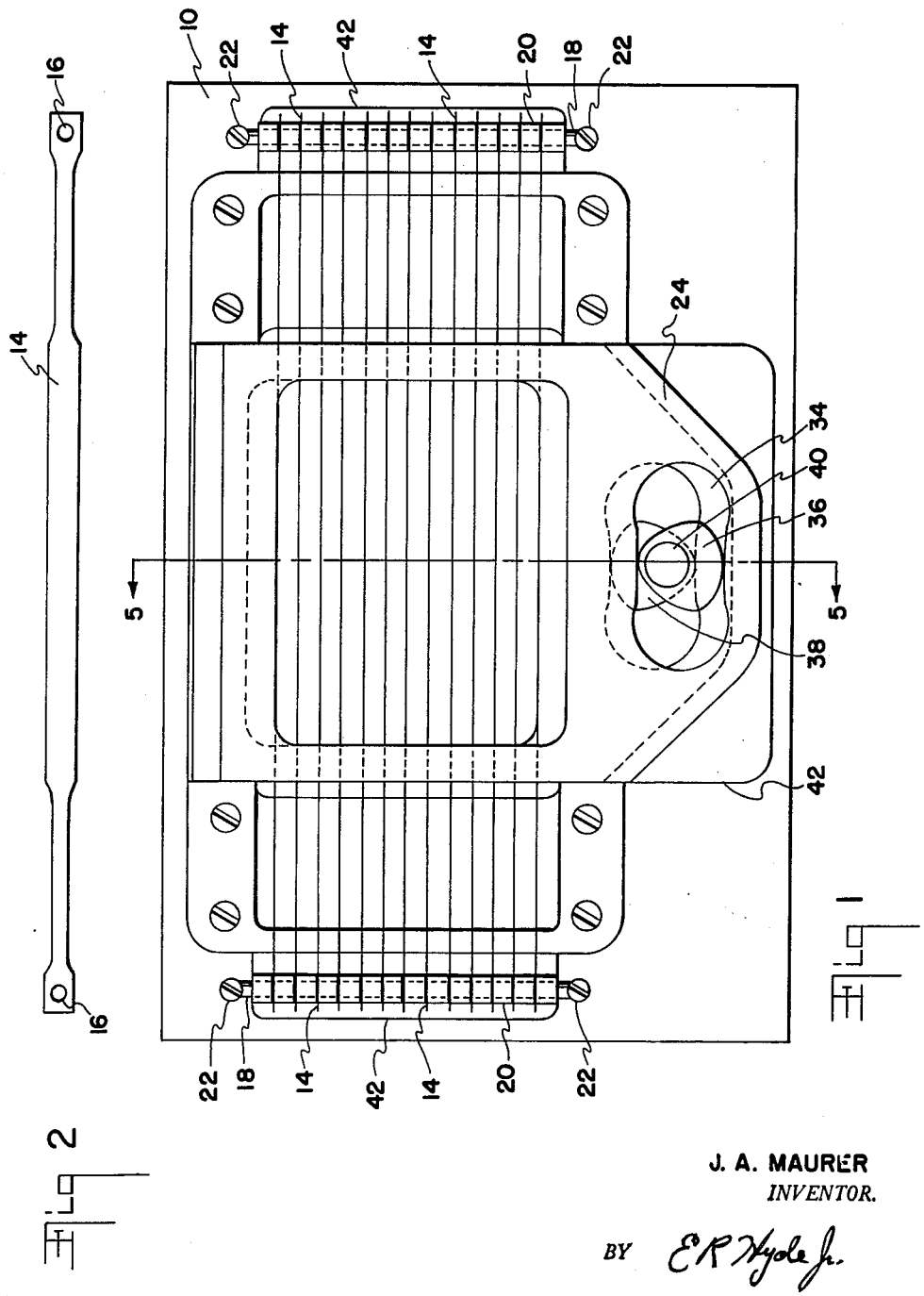

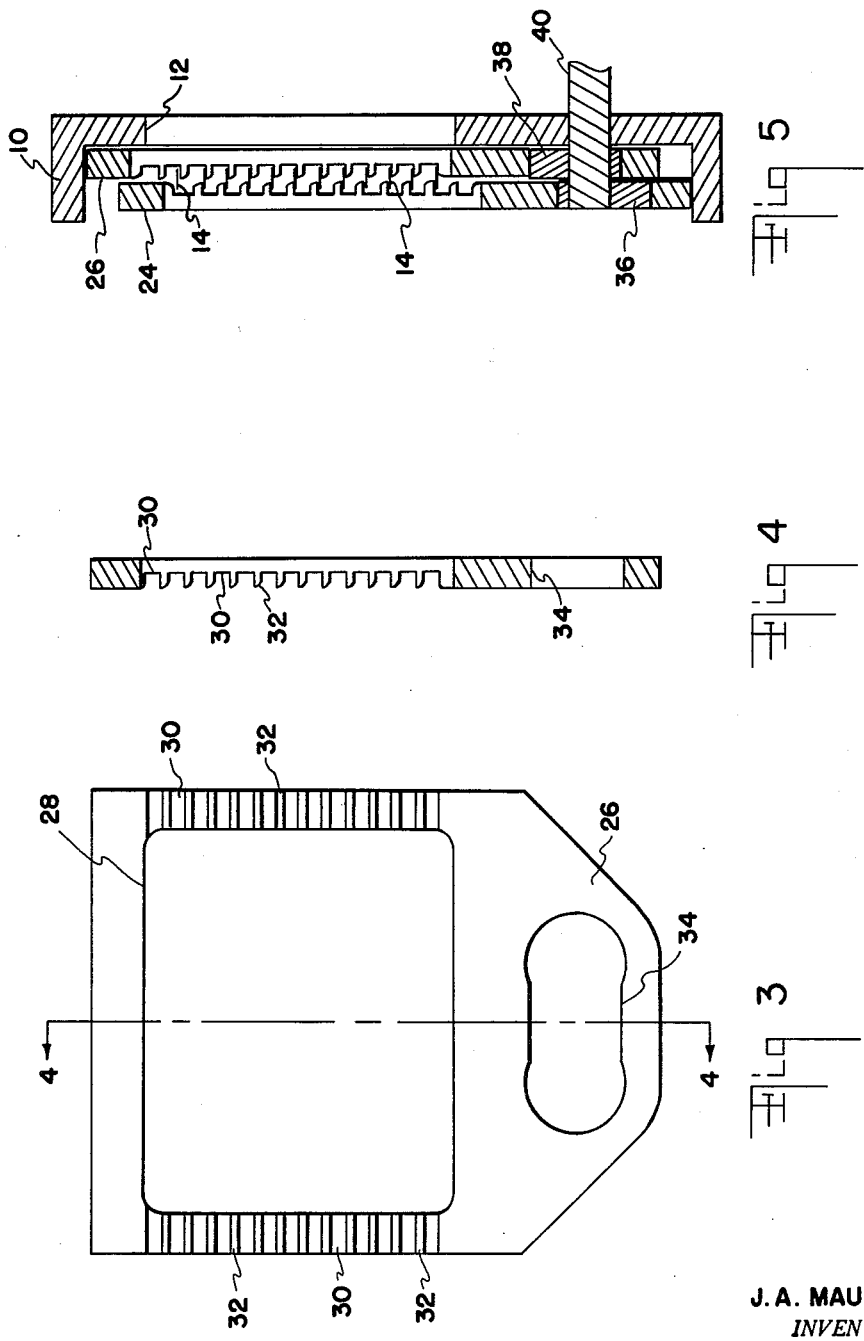

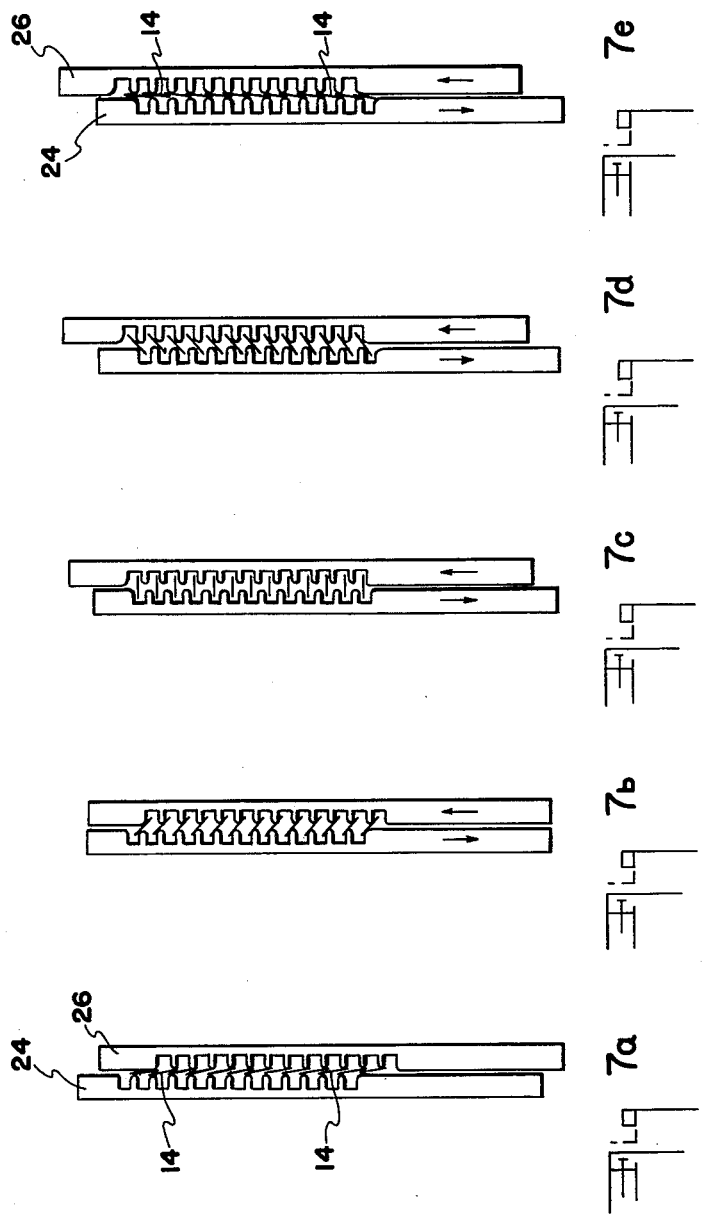

United States Patent Office 3,052,172
Patented Sept. 4, 1962

3,052,172
RADIANT ENERGY SHUTTER APPARATUS
John A. Maurer, New Brunswick, N.J., assignor to The Perkin-Elmer Corporation, Norwalk, Conn., a corporation of New York
Filed Feb. 13, 1959, Ser. No. 793,001
1 Claim. (Cl. 95—53)

This invention relates to improvements in radiant energy apparatus and more particularly to improvements in photographic shutters of the "louver" type. In this type of shutter a series of thin, relatively long and narrow blades are arranged in a manner similar to the slats of the common "Venetian blind" so that when they are turned to the closed position, they overlap at their edges to prevent the passage of light. When the blades are turned 90° from the closed position, they obstruct a very small amount of light and thus permit exposure of the material in the camera.

While shutters of this type have been generally successful, they have had certain basic shortcomings which have restricted their speed, accuracy, reliability, and general usefulness. The louver blades employed in the prior art have most commonly been constructed of a light-weight material and each such blade has been provided at its ends with bearings mounted in a supporting frame. Small gears have been mounted on the extensions of the blade ends where they project from the bearings. By means of these gears motion has been imparted to the blades. In most cases the blades have been turned through an angle of 180°, thereby going from a closed position through an open position to another closed position. Less commonly the blades have been turned through an angle of 90° and back to their original positions. In order to provide accurate and dependable opening times it has been necessary to construct the individual blades so as to impart the necessary stiffness required for self-support between the end bearings and to prevent twisting. This requirement of stiffness has resulted in relatively massive blades which limits the rapidity of operation to exposure speeds on the order of $1/150$ second. It will also be obvious that the prior art construction results in excessive wear due to the relatively large forces required for actuation. It will also be seen that a multiplicity of parts are required with resulting unreliability of operation.

It is, therefore, a primary object of the present invention to provide a simplified louver-type shutter mechanism. Other objects are to provide such a mechanism capable of shorter exposure time, more accurate control of exposure time, and greater reliability of operation. Other objects, features, and advantages of this invention will be apparent from the following description, appended claim, and attached drawings.

The above objects are attained by utilizing the natural elasticity of thin blades in a novel louver-type shutter mechanism. The mechanism comprises a plurality of thin opaque blade means clamped at their ends in substantially parallel relationship. The clamping means holds the ends of each blade in a fixed plane substantially parallel to the planes containing the ends of the other blades. Actuating means are provided in contacting relationship with each of the blades to twist its center portion to alternately block and pass radiant energy.

In the drawings:
FIG. 1 is a front elevational view of one embodiment of the apparatus of the invention;
FIG. 2 is a plan view of a single blade of a type usable in the invention;
FIG. 3 is a front elevational view of one of the actuators shown in FIG. 1;
FIG. 4 is a cross-sectional elevational view of the actuator of FIG. 3 taken along the line 4—4;
FIG. 5 is a cross-sectional elevational view of the apparatus of FIG. 1 taken along the line 5—5;
FIG. 6, views "a" through "q," are diagrammatic views indicating the manner in which the louvers of the invention are controlled;
FIGS. 7a through 7e are diagrammatic views of the operation of an alternative embodiment of the invention.

Referring specifically to the embodiment illustrated in FIG. 1 a base block 10 is provided, having an opening 12 (FIG. 5) for the passage of light therethrough. A series of blades 14 are provided in parallel relationship across the front of opening 12. Each blade is provided with holes 16 (FIG. 2) in the ends thereof by means of which they are secured in base block 10 by rods 18 in combination with spacers 20 and mounting screws 22. A front actuator 24 and a rear actuator 26 are provided on either side of the row of blades. The manner of this construction will be more readily apparent from the cross-sectional view of FIG. 5. Actuators 24 and 26 are similar except for their placement in the combination. FIGS. 3 and 4 illustrate in greater detail the construction of rear actuator 26 which is similar to front actuator 24. It will be seen that the actuator is basically a rectangular frame having an opening 28 a little wider than the opening 12 through the base block. At each side of this frame, slots 30 have been milled so as to leave a series of projections or teeth 32. Each actuator is also provided with a slot 34 having two parallel faces. Base block 10 (FIG. 1) is milled to provide a depression 42 for receiving both rear actuator 26 and front actuator 24 and to provide operating room for blades 14. Cardioid cams 36 and 38 are provided on shaft 40 which extends through base block 10. These cams engage the slots 34 in the front and rear actuators respectively and are displaced 180° from each other to provide opposite forces against the two actuators during rotation of shaft 40. As will be seen by reference to the drawing, the rotation of shaft 40 through an angle of 180° from the position shown in FIG. 1 will result in a shift of relative vertical positions by actuators 24 and 26. As will be apparent from FIG. 5, each end of the wide center portion of each blade 14 may be contacted on one edge by a tooth of rear actuator 26 and on the other edge by a tooth of front actuator 24. The operation of the shutter mechanism of the invention will be better understood by reference to the diagrams of FIG. 6 illustrating one complete cycle of opening and closing the shutter. In view "a" blades 14 have been twisted by the teeth of actuators 24 and 26 to assume substantially vertical positions. Their width is such that their edges overlap and thus prevent the admission of light to the camera or other device being controlled. As shaft 40 is rotated, cams 36 and 38 impart opposite motion to the front and rear actuators as shown by the arrows of FIGS. 6b through 6h. These figures indicate the manner in which the twisting forces applied against blades 14 by the rounded edges of teeth 32 are gradually released allowing the natural elasticity of the blades to return them to the horizontal position shown in 6f. At this point the shutter of the camera is open and light enters between blades 14 practically unobstructed. Actuators 24 and 26 continue to move in opposite directions until the circular portions of cardioid cams 36 and 38 contact the driving edges of the slots in the actuators. At this instant, relative movement between actuators 24 and 26 ceases as illustrated in diagram 6i. The actuators remain halted for a period dependent on the speed of rotation of shaft 40 and the configuration of the cams. In the drawing of FIG. 1, the configuration of cams 36 and 38 is such that no relative motion will take place between actuators 24 and 26 for approximately 90° of revolution of the cams. As rotation continues, the action of cams 36 and 38 begins to return actuator 24 and 26 to their original positions. The shutter remains fully open until blades 14 are once again contacted by the teeth of the actuators and twisted to a closed position as shown in diagrams 6m through 6q. The period during which the shutter is completely open is that elapsing during almost 180° of rotation of shaft 40 and is considerably more than half the total time elapsing from the beginning of the opening action shown in FIG. 6c to the end of the closing action shown in FIG. 6o. This long period during which the shutter remains completely open contrasts with the very short corresponding period in most prior art shutters. In those shutters, the closing action begins at the very instant the shutter reaches the open position as the blades swing uninterruptedly from the closed through the open and back to the closed position.

FIGS. 7a through 7e illustrate an alternative embodiment of the invention. The actuators are here provided with teeth rounded on both sides and are moved through a greater distance. A continuous motion of the actuator from the position illustrated in 7a to that illustrated in 7e opens and closes the shutter. The reverse motion would once again open and close the shutter. This construction allows shorter exposures than that previously described but results in some loss of efficiency.

It will be apparent that, in a shutter of the type described, the blades can be made very thin and light since they are held in position not by their own stiffness but by moderate to very light tension. Highly elastic metals such as hard rolled steel or beryllium copper have been found to be particularly well adapted to use in the construction of shutter blades. Blades have been formed from such metals and operated satisfactorily when of a thickness of .001 to .002 inch. Exposure speeds on the order of $1/400$ second have been readily obtained without placing the blades under any greater tension than that necessary to prevent them from sagging under their own weight. Where higher speeds are necessary, individual springs can be applied to the ends of the ribbons to maintain them under positive tension. This results in the production of much greater forces tending to untwist the ribbons.

As an example of this invention, a shutter of the type described and illustrated was constructed employing 13 stainless steel blades .001 inch thick. Each blade was 4.8 inches long overall. The center portion of the blade was 2.6 inches long and .16 inch wide, the narrower portions at the ends were .08 inch wide. The actuators were constructed of aluminum alloy and had an overall thickness of approximately .15 inch. The opening was approximately 2 inches by 1.6 inches wide. When operated in the manner diagrammed in FIG. 6, a shutter speed of $1/400$ second was obtained.

When constructing shutters of a type disclosed herein, it is possible to provide a shutter comprising a large number of very thin blades. In this manner, the obstruction of light while the shutter is open is reduced to an almost negligible value, especially in those applications not requiring a cone of light of considerable angle. This would include, for example, all photographic applications wherein the focal length of the objective lens is great in comparison with the size of the picture being taken. As this type of construction permits the blades to open very quickly and then remain open for a relatively long period, high photographic efficiency results. Furthermore, even though in some applications it may become necessary to apply large forces to move the actuators in very short periods of time, these large forces are not brought to bear on the shutter blades themselves. The blades are subjected only to forces sufficient to twist them from the open to the closed position. For this reason, this type of shutter has a long working life.

While the description of the invention has been primarily directed to an improved photographic shutter, it is to be understood that the invention is not so limited, but is equally adaptable to the controlled admission of radiant energy to any type of apparatus utilizing such energy.

What is claimed is:

A camera shutter for alternately blocking and passing radiant energy which comprises, in combination, base plate means containing an aperture for the transmission of radiant energy therethrough; first actuating frame means having an aperture therein aligned with the aperture of said base plate means, said first frame means being in reciprocating slidable relationship with said base plate means along an axis thereof; first actuating teeth means on that surface of said first actuating frame means opposite said base plate means, said teeth disposed parallel to one another and perpendicular to said axis of reciprocation and on opposite sides of said aperture; second actuating frame means having an aperture therein aligned with both the base plate aperture and the first actuating frame aperture, said second frame means being in reciprocating slidable relationship with said first actuating frame means along the axis of reciprocation of said first frame means; second actuator teeth means on that surface of said second actuator frame means opposing said first actuator frame means, said teeth disposed parallel to one another and perpendicular to said axis of reciprocation and on opposite sides of the aperture; means maintaining said first and second actuator teeth means in separated relationship during said relative motion between said first and second actuating frame means; a plurality of opaque leaf spring blade means having their longitudinal axes in substantially parallel spaced coplanar relationship extending across said aperture and between said first and second actuator teeth means, each of said blade means being characterized by uniform thinness throughout and a width less than the spacing between the bases of said first and second actuating teeth means, the spacing between adjacent blades being greater than the thickness of the intervening tooth means; clamping means on said base plate means supporting and retaining the ends of each of said blade means in a fixed plane substantially parallel to the planes containing the ends of said other blade means; driving means in operating relationship with said first and second actuating frame means to move said first and second actuating teeth means relative to each other to selectively engage solely the face of the center portion of each blade means to twist said blades into overlapping relationship to block the passage of radiant energy through said aperture, whereby said blades are free from compressive forces during the twisting operation.

References Cited in the file of this patent

UNITED STATES PATENTS

| 1,919,115 | Maury et al. | July 18, 1933 |
| 2,749,581 | McCormick | June 12, 1956 |
| 2,755,700 | Ljungstrom | July 24, 1956 |

FOREIGN PATENTS

| 301,632 | Italy | 1932 |
| 874,281 | Germany | 1953 |